(12) United States Patent
Kim

(10) Patent No.: US 6,280,275 B1
(45) Date of Patent: Aug. 28, 2001

(54) METHOD OF WELDING SHADOWMASK IN FLAT CATHODE RAY TUBE

(75) Inventor: Sung Yeun Kim, Kyongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/435,716

(22) Filed: Nov. 8, 1999

(30) Foreign Application Priority Data

Nov. 7, 1998 (KR) .................................................. 98/47671

(51) Int. Cl.$^7$ ................................. H01J 9/18; B23K 26/04
(52) U.S. Cl. .................................................................. 445/30
(58) Field of Search ............................................... 445/30

(56) References Cited

U.S. PATENT DOCUMENTS 4,828,523 * 5/1989 Fendley et al. ........................ 445/30
4,834,686 * 5/1989 Kautz et al. ............................ 445/30

\* cited by examiner

Primary Examiner—Kenneth J. Ramsey

(57) ABSTRACT

Method for welding a mask in a flat cathode ray tube, including applying an initial tensile force to a shadow mask to prevent deformation, and fastening the shadow mask to a rail by welding, wherein fastening the shadow mask includes performing a primary spot welding having relatively long primary welding spot intervals between primary welding spots, and a secondary spot welding having secondary welding spot intervals between secondary welding spots shorter than the primary welding spot intervals.

7 Claims, 3 Drawing Sheets

METHOD OF WELDING SHADOWMASK IN FLAT CATHODE RAY TUBE

BACKGROUND OF THE INVENTION

1. Field of the Invention

The present invention relates to a method for welding a shadow mask, and more particularly, to a method for welding a shadow mask in a flat CRT(Cathode Ray Tube).

2. Description of the Related Art

Recently, CRTs used as TV receivers or image displays have been provided with a flat surface which can eliminate image distortion, minimize reflection of external light, and maximize a visual area. As shown in FIG. 1, a conventional flat CRT is provided with a panel 1 having an inside surface coated with a fluorescent material 1a, an inner shield (not shown) fixed to the inside surface of the panel 1 to provide shielding from external magnetic fields, a funnel 5 sealed to an inside surface periphery of the panel 1 by frit glass, and a neck portion 5a positioned at a rear of the funnel. An electron gun 6 is provided in the neck portion 6 for emitting three colored electron beams of R, G, B. A deflection yoke (or deflection coil) 7 is provided on an outer circumference of the neck portion 5a for deflecting the electron beams in horizontal or vertical direction. The panel 1 is provided with safety glass 2 fixed to a front surface thereof by resin to prevent bursting of the cathode ray tube, and a rail 3 is fixed to an inside surface of the panel 1. A shadow mask 4 is attached to the rail 3 for selecting a color from the electron beam. The rail 3, a rectangular frame, is used to attach the shadow mask 4 to the inside surface of the panel 1 with an appropriate distance between the shadow mask 4 and the panel 1. The rail 3 has a side facing the panel 1 with a groove 3a formed therein containing frit glass, and a contact surface 3b on the other side thereof contacting the shadow mask 4. When molten frit glass fills the groove 3a, and the rail 3 is attached to the inside surface of the panel 1, the rail 3 is fixed to the inside surface of the panel 1 when the molten frit glass solidifies. The shadow mask 4 is then placed on the contact surface 3b while the shadow mask 4 is subjected to a tensile stress and is bonded to the rail 3 by welding. Since the shadow mask 4 for use in a conventional flat CRT is formed of a thin plate (around 0.1 mm thick), the use of resistance welding is not desirable because the resistance welding causes a large mechanical deformation in the shadow mask and forms a large heat-affected zone. Therefore, laser beam welding is used to weld the shadow mask in a flat CRT, which provides fast and high quality welding, with a relatively small deformation and heat-affected zone of the object being welded.

However, despite of the use of laser welding, the shadow mask 4 may still be damaged and deformed during the welding, as follows.

In laser beam line welding, the thin plate may be pushed forward in the direction that the welding is progressing, causing the plate to be welded at a position deviated from a desired position. In order to avoid such a defect when a spot welding is used, there may be plastic deformation caused by thermal stress in the vicinity of welding spot if the welding is carried out without accurately calculating a size of the welding spot and a distance between the welding spot. The plastic deformation causes of distortion because of a difference of thermal expansion coefficients when heating occurring during fabrication of the flat CRT dissipates.

Even though laser welding is employed, welding the shadow mask 4 and the rail 3 by the aforementioned one run welding causes many defects, and results in low productivity since a high level of skill is required to prevent the defects.

SUMMARY OF THE INVENTION

Accordingly, the present invention is directed to a method for welding a shadow mask that substantially obviates one or more of the problems due to limitations and disadvantages of the related art.

An object of the present invention is to provide a method for welding a shadow mask in a flat CRT, which can prevent deformation or damage of the shadow mask, to provide an accurate welding.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for welding a shadow mask in a flat cathode ray tube includes: (1) applying an initial tensile force to a shadow mask for preventing deformation, and (2) fastening the shadow mask to a rail by welding, wherein fastening the shadow mask to a rail includes performing a primary spot welding having relatively long primary welding spot intervals between welding spots, and performing a secondary spot welding having secondary welding spot intervals between welding spots shorter than the primary welding spot intervals.

The primary and secondary spot weldings are performed using laser welding.

Preferably, the primary welding spot interval in the primary spot welding is set to be a min. $1/200$ to max. $1/100$ of the width/length of the rail/shadow mask, and more preferably, the primary welding spot interval in the primary spot welding is $1/150$ to $1/125$ of the width/length of the rail/shadow mask.

The secondary welding spot interval in the secondary spot welding is set to be a min. $1/600$ to max. $1/300$ of a width/length of the rail/shadow mask.

The welding spot diameter according to the present invention is set, (also taking a thickness of the shadow mask into consideration) to provide an adequate welding strength to the welding spot.

Specifically, the diameter of the welding spot in the primary and secondary spot welding is set to be approx. 10~30 times of a thickness of the shadow mask.

Accordingly, the aforementioned method for welding a shadow mask of the present invention can provide adequate welding strength and accuracy without causing deformation, thereby reducing defective welding and improving productivity.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incor porated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
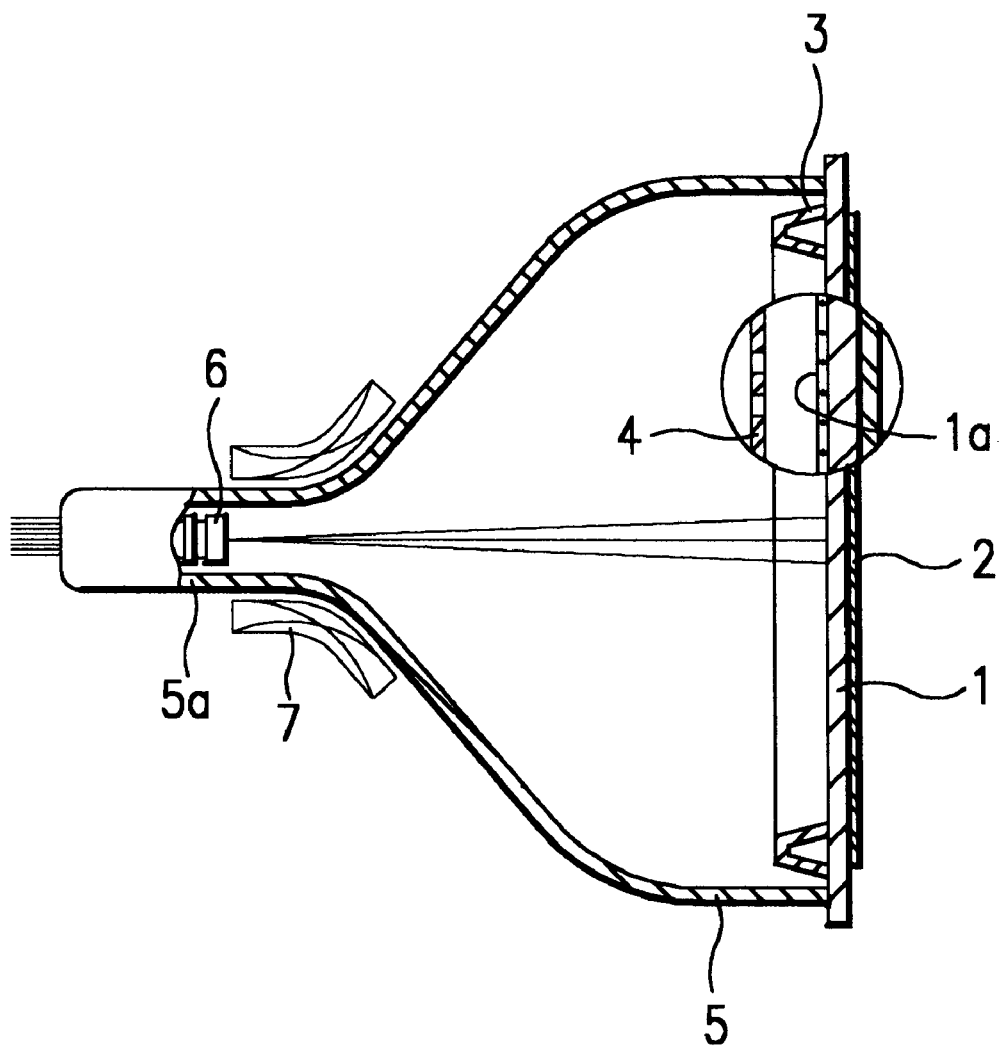
FIG. 1 is a section of a related art flat CRT.
Figure 2:
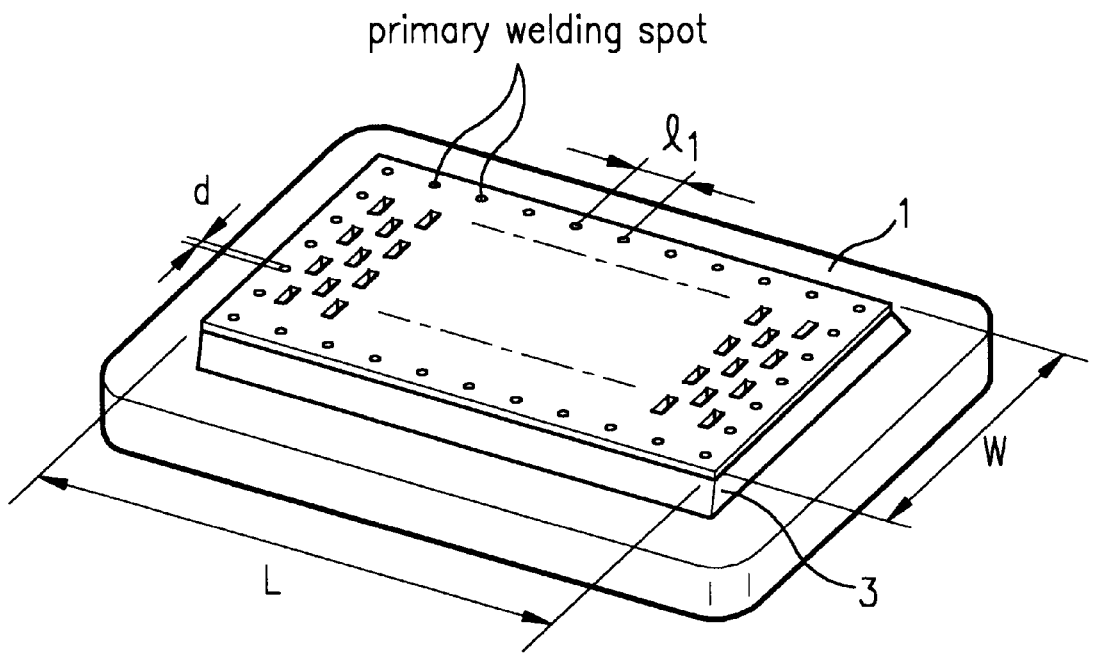
FIG. 2 is a perspective view showing a primary spot welding state of a rail and a shadow mask in accordance with a preferred embodiment of the present invention.
Figure 3:
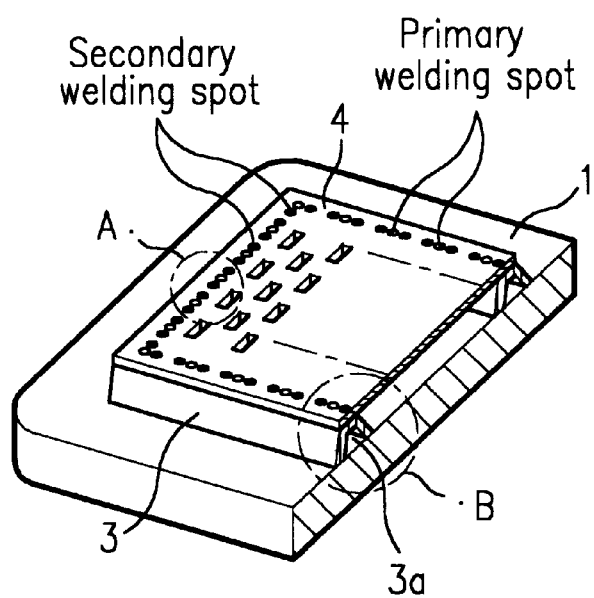
FIG. 3 is a perspective view of a welding state completed in accordance with the present invention.

Reference will now be made in detail to the preferred embodiments of the present invention, examples of which are illustrated in the accompanying drawings. In the following explanations of the preferred embodiments, the same names and reference numerals will be used for identical components, and repeated explanations for the same will be omitted. FIG. 2 is a perspective view illustrating primary spot welding of a rail 3 and a shadow mask 4 in accordance with a preferred embodiment of the present invention, and FIG. 3 is a perspective view of welding completed in accordance with the present invention. A method for welding a shadow mask and rail in a flat cathode ray tube in accordance with the present invention will be explained with reference to FIGS. 2 and 3

In general, an initial tensile force is applied to a shadow mask 4 to prevent thermal deformation of the shadow mask 4 during fabrication of the flat CRT, and the shadow mask 4 is then fixed to a rail 3 by welding. The welding is preferably preformed using laser spot welding. The welding of the shadow mask 4 is influenced by the intervals between welding spots and a welding diameter of the welding spot, i.e., a welding size, which are related to a length of the rail and a thickness of the shadow mask. With regard to intervals between welding spots, the present invention uses a primary spot welding which has relatively long intervals between the primary welding spots and a secondary spot welding which has short intervals between the secondary welding spots (in comparison to the primary spot welding) in attaching the rail 3 to the shadow mask 4.

The primary welding will be explained in detail with reference to FIG. 2.

Since primary spot welding is a preliminary process before conducting secondary spot welding, the welding intervals between the primary welding spots must be adequately long and a strength of the welds must be strong enough to prevent the shadow mask 4 from separating from the rail 3 because of the initial tensile force applied to the shadow mask 4. Under this condition, a primary welding spot interval 11 (see FIG. 2) is a min. 1/200 to a max. 1/100 of a width/length W and L of the rail 3/shadow mask 4, respectively. The primary welding spot interval 11 is obtained from experiment. The rail 3 is rectangular with a different width W and length L, so the width and length primary welding spot interval 11 may vary. Actually, the primary welding spot interval 11 permits fixing the shadow mask 4 with respect to the rail 3 so that secondary welding can be accurately carried out. Preferably, a primary welding spot interval 11 is 1/150~1/125 of the width/length of the rail 3/shadow mask 4, which yields the best primary welding results.

Figure 4:
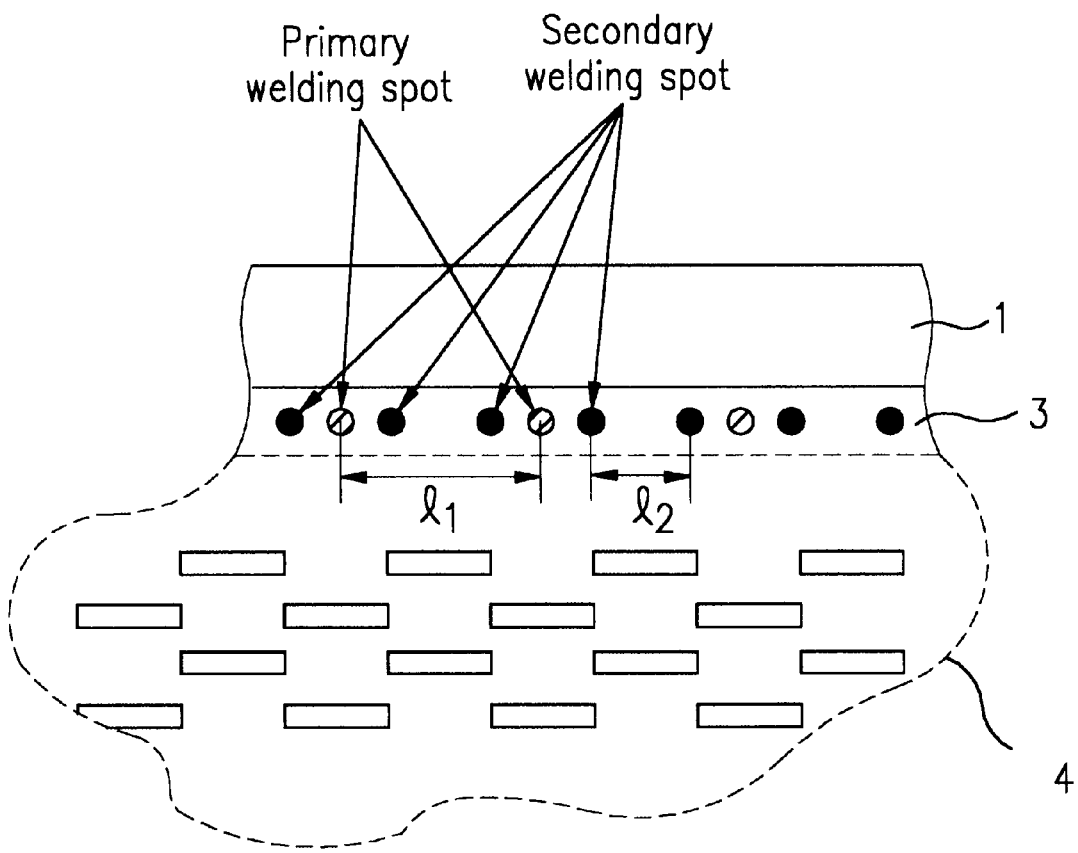
FIG. 4 is an enlarged view of the "A" portion in FIG. 3 showing a completed welding state including the secondary welding; and, FIG. 5 is an enlarged view of the "B" portion in FIG. 3 to illustrate a relation between a size of welding and a welding depth.

FIG. 4 is an enlarged view of the "A" portion in FIG. 3 showing a completed welding state including the secondary welding. The secondary welding will be explained, in detail, with reference to FIG. 4.

Since the secondary spot welding is a main process for fixing the rail 3 and the shadow mask 4 firmly, the secondary welding spot intervals 12 are shorter than the primary welding spot intervals 11 to provide adequate bonding strength without overlapping the secondary welding spots with the primary welding spots. In more detail, the minimum interval between the secondary welding spots is greater than a diameter 'd' of a primary welding spot, but smaller than a ½ of the interval 11 between the primary welding spots. If the welding interval 12 between the secondary welding spots is smaller than the diameter of a secondary welding spot, the heat-affected zones formed during welding overlap effectively, resulting in line welding. The heat-affected zones formed in succession in the vicinity of the welding spots form a plastically deformed region, that causes deformation of the thin shadow mask 4 in the flat CRT during following fabrication of the flat CRT. While a tensile force applied to the shadow mask 4 is approx. 19.4 N/mm², the maximum tensile strength a properly welded welding point can sustain is approx. 20 N. Therefore, taking a safety factor into consideration, there should be one welding spot for at least every 1.1 mm, a minimum interval between the secondary welding spots should be smaller than ½ of the primary welding spot interval 11 if the calculation is based on the interval 11 between the primary welding spots. Therefore, if the interval 12 between the secondary welding spots is greater than ½ of the interval 11 between the primary welding spots, since a tensile force applied to one welding spot is increased, so the welded portion of the shadow mask may be deformed. According to this condition, the interval 12 between the secondary welding spots is a min. 1/600 and a max. 1/300 of the width/length 'W' and 'L' of the rail 2/shadow mask 4. As in the case of the interval 11 between the primary welding spots, the interval 12 between the secondary welding spots is also measured in an experiment meeting the secondary welding requirements. As the rail 3 is rectangular with different width 'W' and length 'L', the welding intervals in the width and the length directions are different from each other. As shown in FIG. 3, such a setting of the secondary welding spot interval 12 provides ideal overall welding with no deformation or damage to the shadow mask 4 in the flat CRT. Moreover, fixing the position of the shadow mask 4 in the flat CRT with the primary spot welding in advance facilitates the secondary spot welding to provide an accurate welding with optimal bonding strength.

Figure 5:
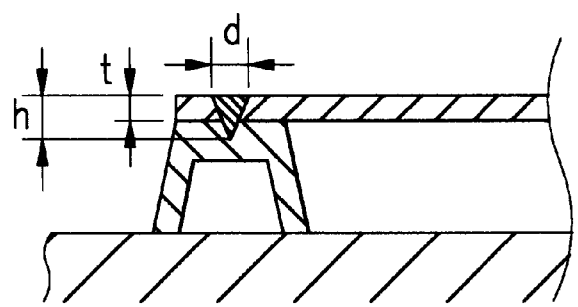

In the meantime, the diameter 'd' of the welding spot is another factor that influences welding quality in the shadow mask 4 in the flat CRT. FIG. 5 is an enlarged view of the "B" portion in FIG. 3 for explaining a relation between a size of a weld (i.e., a diameter of the welding spot 'd') and a welding depth 'h'. The relation between a size of the weld (i.e., a diameter of the welding spot 'd') and the welding state of the shadow mask 4 will be explained.

In general, it is known from experiments that adequate welding strength of a welding spot which can sustain an external impact can be obtained when the bonding ratio is more than 70%, and the highest bonding strength (i.e., the welding strength) can be obtained when a diameter of a welding spot 'd' is the same as a depth 'h' of the welding.

On the other hand, because of a high likelihood of deformation because of the thin thickness 't' of the shadow mask 4, the diameter of the welding spot 'd' directly related to the welding strength is limited by the thickness 't' of the shadow mask 4. If the diameter 'd' of the welding spot is more than 30 times of the thickness 't' of the shadow mask 4, a hole is punctured in the welding spot due to an excessive increase of a heated surface area even though the welding depth 'h' is increased. If the diameter 'd' of the welding spot is less than 10 times of the thickness 't' of the shadow mask 4, the bonding ratio falls below 70%. Those are causes of a welding strength decrease at a welding spot of the shadow mask 4. Accordingly, the diameter 'd' of the welding spot is approx. 10~30 times the thickness 't' of the shadow mask 4. Actually, the welding spot diameter 'd' can provide adequate weld strength to a welding portion of the shadow mask 4 and the rail 3. Thus, in the method for welding a shadow mask in a flat CRT of the present invention, after the related art step of applying an initial tensile force, the shadow mask is welded by the primary and secondary spot welding conducted in succession following a movement of a welding apparatus on a preset path.

As explained, the set primary and secondary intervals 11 and 12 and the diameter 'd' of the welding spot are obtained from experiments, experimental results of which experiments that verify the experiments will be given for reference.

EXPERIMENT 1

Conditions of the experiment: rail ¾ length of the shadow mask 4 ; L=335 mm, and W=254 mm(based on 17" CRT).
(a) an interval 11 between primary welding spots: $1/134$ of each rail length (A range of the primary welding spot interval of the present invention $1/200$~$1/100$).
(b) an interval 12 between secondary welding spots: $1/335$ of each rail length (A range of the secondary welding spot interval of the present invention $1/600$~$1/300$).
a result of the experiment: in annealing for attachment of the panel 1 to the funnel 6, neither plastic deformation or tear off occurred.

EXPERIMENT 2

Conditions of the experiment : identical to Experiment 1.
(a) an interval 11 between primary welding spots: $1/100$ of each rail length (A range of the primary welding spot interval of the present invention $1/200$~$1/100$).
(b) an interval 12 between secondary welding spots: $1/250$ of each rail length (A range of the secondary welding spot interval of the present invention $1/600$~$1/300$).
a result of the experiment: a weld portion of the shadow mask 4 could not sustain the initial tensile force and was therefore torn off due to the great interval 12 between the secondary welding spots.

EXPERIMENT 3

Conditions of the experiment: identical to the Experiment 1.
(a) an interval 11 between primary welding spots: $1/200$ of each rail length (A range of the primary welding spot interval of the present invention $1/200$~$1/100$).
(b) an interval 12 between secondary welding spots: $1/500$ of each rail length (A range of the secondary welding spot interval of the present invention $1/600$~$1/300$).
a result of the experiment: plastic deformation occurred in the weld portion due to the short intervals between the secondary welding spots, and corrugations were formed in the vicinity of the welding spots of the shadow mask 4 after annealing.

In conclusion, as can be seen from the above experiments, the method for welding a shadow mask in a flat CRT according to the present invention is conducted in succession following the preset primary and secondary welding spot intervals 11 and 12, thereby providing an accurate welding state which has no deformation. An adequate weld strength is provided by the set welding spot diameter.

It will be apparent to those skilled in the art that various modifications and variations can be made in the method for welding a shadow mask in a flat cathode ray tube of the present invention without departing from the spirit or scope of the invention. Thus, it is intended that the present invention cover the modifications and variations of this invention provided they come within the scope of the appended claims and their equivalents.

What is claimed is:

1. A method for welding a shadow mask in a cathode ray tube, comprising:

applying an initial tensile force to a shadow mask; and
welding the shadow mask to a rail, wherein welding the shadow mask includes
performing a primary spot welding having primary welding spot intervals between respective primary welding spots, wherein each primary welding spot interval is between $1/150^{th}$ and $1/125^{th}$ of a length of a respective side of the rail; and
performing a secondary spot welding having secondary welding spot intervals between respective secondary welding spots, the secondary welding spot intervals each being shorter than a respective primary welding spot interval.

2. The method according to claim 1, wherein performing primary and secondary spot welding each comprise performing laser spot welding.

3. The method according to claim 1, wherein said primary spot welding includes fixing a position of the shadow mask relative to the rail initially in order to improve an accuracy of said secondary spot welding.

4. The method according to claim 1, wherein said secondary spot welding provides the main attachment of the shadow mask to the rail, relative to the primary spot welding.

5. The method according to claim 1, wherein each secondary welding spot interval is between $1/600$th and $1/300$th of a length of a respective side of the rail.

6. The method according to claim 1, wherein a diameter of respective primary and secondary welding spots is approximately 10 to 30 times a thickness of the shadow mask.

7. The method according to claim 1, wherein the primary welding spots and the secondary welding spots do not overlap each other.

* * * * *